United States Patent
Tsai

(10) Patent No.: US 6,695,647 B2
(45) Date of Patent: Feb. 24, 2004

(54) CARD CONNECTOR HAVING TWO ROWS OF TERMINALS EXTENDING OUT OF A BASE AT THE SAME SIDE

(76) Inventor: Chou Hsuan Tsai, 15F, No. 4, Lane 127, Sec. 1, Fu-Hsing Rd., Hsin-Chuang City, Taipei Hsien (TW)

( * ) Notice: Subject to any disclaimer, the term of this patent is extended or adjusted under 35 U.S.C. 154(b) by 0 days.

(21) Appl. No.: 10/292,982

(22) Filed: Nov. 12, 2002

(65) Prior Publication Data

US 2003/0100226 A1 May 29, 2003

(51) Int. Cl.$^7$ .......................... H01R 24/00; H01R 13/15
(52) U.S. Cl. ........................................ 439/630; 439/260
(58) Field of Search .................. 439/630, 629, 439/636, 637, 260, 60

(56) References Cited

U.S. PATENT DOCUMENTS 5,667,408 A * 9/1997 Broschard et al. .......... 439/630
6,017,246 A * 1/2000 Hisazumi et al. .......... 439/637
6,358,061 B1 * 3/2002 Regnier ...................... 439/60

* cited by examiner

Primary Examiner—Chandrika Prasad
(74) Attorney, Agent, or Firm—Pro-Techtor International Services

(57) ABSTRACT

A card connector includes a base and a row of first upper terminals. The base has a top surface and a bottom surface and is formed with a card slot for receiving an electric card. The card slot has an insert port from which the electric card may be inserted. The upper terminals are arranged on the base. Each upper terminal has a contact positioned within the card slot for elastically contacting the inserted electric card, a pin extending out of the bottom surface of the base, and an extension connecting the contact to the pin. Each contact is convex toward the bottom surface of the base. Each contact is elastically biased toward the top surface of the base when contacting the electric card. Each pin extends out of the bottom surface of the base from a side opposite to the insert port of the card slot.

4 Claims, 3 Drawing Sheets

US 6,695,647 B2

CARD CONNECTOR HAVING TWO ROWS OF TERMINALS EXTENDING OUT OF A BASE AT THE SAME SIDE

BACKGROUND OF THE INVENTION

1. Field of the Invention

The invention relates to an electric connector, and in particular to a card connector connecting to an electric card.

2. Description of the Related Art

Referring to FIGS. 1 and 2, a conventional card connector for an electric card, such as a telephone card or an ATM card, to be inserted for connection includes a base 10 and two rows of terminals 20 arranged on the base 10. The base 10 includes a top surface 11 and a bottom surface 12, and is formed with a card slot 13 for receiving the electric card. The card slot 13 has an insert port 14. Each terminal 20 has a contact 21 and a pin 22. The contacts 21 in the shapes of convex arcs facing toward the top surface 11 of the base are positioned within the card slot. The pins 22 of the two rows of terminals extend out of the bottom surface 12 of the base from a first side near the insert port 14 and a second side opposite to the insert port 14, respectively.

When being used, the card connector is typically mounted on a face side of a circuit board 90. An electric card 95 is inserted from the insert port 14 according to an indicated direction on the card (or with connection points 96 facing downward). Then, the connection points 96 may elastically contact the contacts 21 of the two rows of terminals, respectively. At this time, the contacts 21 are elastically biased toward the bottom surface 12 of the base.

In the conventional card connector mentioned above, because all of the contacts of the terminals are convex toward the top surface 11 of the base, there are some following disadvantages during usage.

1. The card has to be inserted according to the indicated direction on the card (or with the connection points 96 facing downward). When the card is oppositely inserted, the machine will not accept the card.

2. Because miniature electrical products are gradually developed, if the layout space of the circuit board is limited, the card connector has to be arranged on a back side of the circuit board. In this case, the contacts 21 of the terminals have to be convex downward. If the card is inserted according to the indicated direction on the card (or with the connection points 96 facing downward), the contacts 21 may not contact the connection points 96 and the card is not accepted similarly.

SUMMARY OF THE INVENTION

An object of the invention is to provide a card connector suitable for the operation according to the indicated direction on the electric card even when the card connector is mounted on a back side of the circuit board.

Another object of the invention is to provide a card connector suitable for card insertions and connections in a face-up manner or a face-down manner, thereby facilitating the user's operation.

To achieve the above-mentioned objects, the invention provides a card connector including a base and two rows of upper terminals. The base has a top surface and a bottom surface and is formed with a card slot for receiving an electric card. The card slot has an insert port from which the electric card may be inserted. The upper terminals are arranged on the base. Each of the upper terminals has a contact positioned within the card slot for elastically contacting the inserted electric card, a pin extending out of the bottom surface of the base, and an extension connecting the contact to the pin. Each of the contacts of the upper terminals is convex toward the bottom surface of the base. Each of the contacts of the upper terminals is elastically biased toward the top surface of the base when contacting the electric card. Each of the pins of the upper terminals extends out of the bottom surface of the base from a side opposite to the insert port of the card slot.

DETAILED DESCRIPTION OF THE INVENTION

Figure 1:
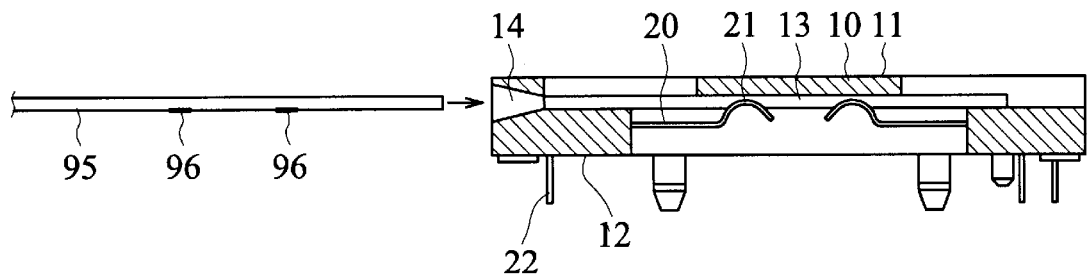
FIG. 1 is a cross-sectional view showing a conventional card connector.
Figure 2:
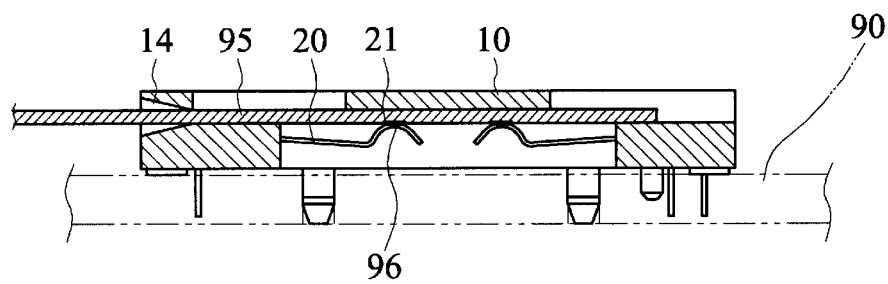
FIG. 2 is a cross-sectional view showing the conventional card connector in an operation state.
Figure 3:
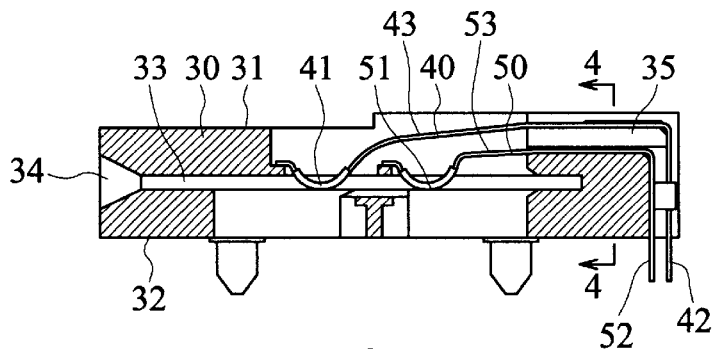
FIG. 3 is a cross-sectional view showing a card connector according to a first embodiment of the invention.
Figure 4:
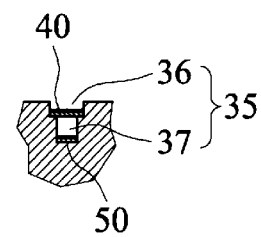
FIG. 4 is a cross-sectional view taken along a line 4—4 of FIG. 3.

Referring to FIGS. 3 and 4, a card connector according to a first embodiment of the invention includes a base 30 and two rows of first upper terminals 40 and second upper terminals 50 arranged on the base 30.

The base 30 has a top surface 31 and a bottom surface 32, and is formed with a card slot 33 for receiving an electric card. The card slot 33 has an insert port 34 from which the electric card may be inserted. The base 30 is also formed with spaced terminal slots 35 at a side away from the insert port 34 and above the card slot 33. Each of the terminal slots 35 includes a wider upper slot 36 and a narrower lower slot 37.

Each of the second upper terminals 50 has a contact 51, a pin 52 and an extension 53, and is positioned within the lower slot 37 of the base 30. The contacts 51 in the shapes of convex arcs facing toward the bottom surface 32 of the base are positioned within the card slot 33. When the electric card is inserted into the card slot 33 to elastically contact the contacts 51, the contacts 51 are elastically biased toward the top surface 31 of the base. On the other hand, each pin 52 extends out of the bottom surface 32 of the base from a side opposite to the insert port 34. The extensions 53 connect the contacts 51 to the pins 52, respectively, and serve as elastic arms.

Each of the first upper terminals 40 has a contact 41, a pin 42, and an extension 43, and is positioned within the upper slot 36 of the base 30. The contacts 41 in the shapes of convex arcs facing toward the bottom surface 32 of the base are positioned within the card slot 33 and aligned with the contacts 51 of the second upper terminals 50. It should be noted that the contacts 41 are close to the insert port 34. When the electric card is inserted into the card slot 33 to elastically contact the contacts 41, the contacts 41 are elastically biased toward the top surface 31 of the base. On the other hand, each pin 42 extends out of the bottom surface 32 of the base from a side opposite to the insert port 34. The extensions 43 connect the contacts 41 to the pins 42, respectively, and serve as elastic arms. The extensions 43 are mounted within the upper slots 36, so the positions of the extensions 43 are higher than those of the extensions 53 of the second upper terminals 50.

In FIG 3, the contacts 41 of the first upper terminals 40 are closer to the insert port 34 than the contacts 51 of the second upper terminals 50. The extensions 43 of the first upper terminals 40 are closer to the top surface 31 of the base 30 than the extensions 53 of the second upper terminals 50. The pins 52 of the second upper terminals 50 are closer to the insert port 34 than the pins 42 of the first upper terminals 40.

Figure 5:
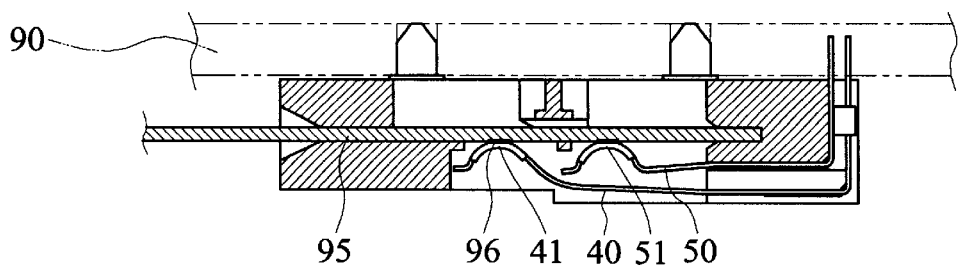
FIG. 5 is a cross-sectional view showing the card connector in an operation state according to the first embodiment of the invention.

It could be understood from the above-mentioned structure that both of the contacts 41 and 51 are convex toward the bottom surface of the base (of with the convex arcs facing downward), the contacts 41 and 51 are elastically biased upward upon the insertion of the electric card. As shown in FIG. 5, when the card connector of the invention is arranged and mounted on the back side of the circuit board 90, the contacts 41 and 51 are in the shapes of convex arcs facing upward. Therefore, the electric card 95 may be inserted into the card slot 33 according to the indicated direction on the card (or with the connection points 96 facing downward) for the connection points 96 to elastically contact the contacts 41 and 51.

Figure 6:
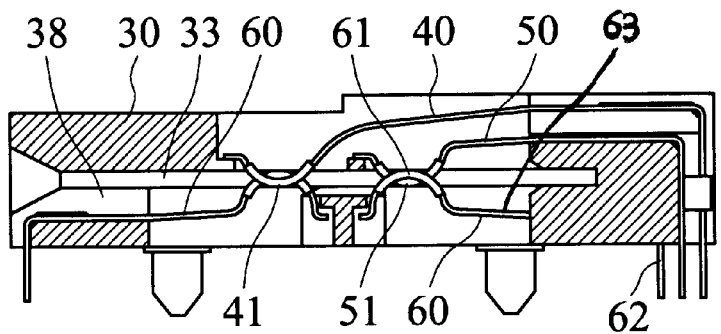
FIG. 6 is a cross-sectional view showing a card connector according to a second embodiment of the invention.

Referring to FIG. 6, a card connector according to a second embodiment of the invention includes additional two rows of first and second lower terminals 60 in comparison with the first embodiment. The base 30 is further formed with two spaced terminal slots 38 at two sides lower than the card slot 33. The two rows of lower terminals 60 are positioned within the terminal slots 38. The lower terminals 60 have contacts 61 in the shapes of convex arcs facing toward the top surface of the base, pins 62 extending out of the bottom surface at two sides of the base, and extensions 63 connecting the contacts 61 to the pins 62, respectively.

Figure 7:
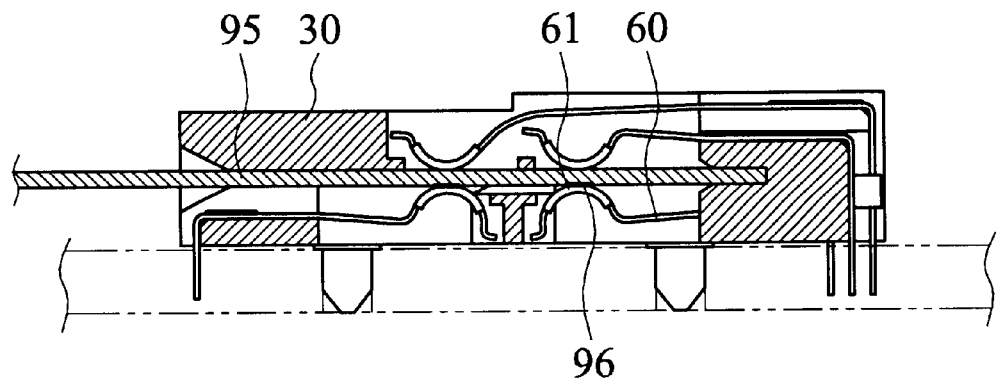
FIG. 7 is a cross-sectional view showing the card connector in an operation state according to the second embodiment of the invention.
Figure 8:
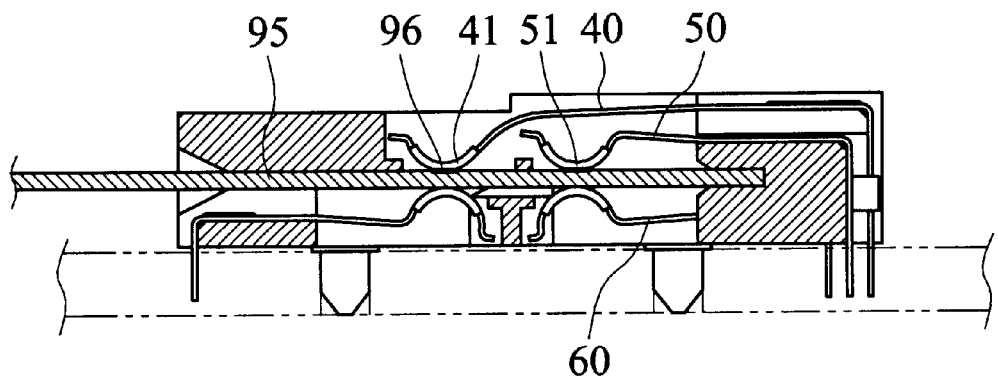
FIG. 8 is a cross-sectional view showing the card connector in another operation state according to the second embodiment of the invention.

According to the above-mentioned structure, the card connector of this embodiment includes the contacts 41 and 51 in the shapes of convex arcs facing toward the bottom surface of the base, and the contacts 61 in the shapes of convex arcs facing toward the top surface of the base. As shown in FIG. 7, when the electric card 95 is inserted into the card slot 33 according to the indicated direction on the card (or with the connection points 96 facing downward), the contacts 41 and 51 may elastically contact the connection points 96. As shown in FIG. 8, when the electric card 95 is inserted into the card slot 33 in a manner opposite to the indicated direction on the card (or with the connection points 96 facing upward), the connection points 96 may be in contact with the contacts 61, respectively.

The card connector according to the above-mentioned embodiments has the following advantages.

1. When the card connector has to be arranged on the back side of a circuit board, the card may still be inserted according to the indicated direction on the card.

2. The card may be inserted either in a face-up manner or a face-down manner, so the operation of the user may be more convenient.

Figure 9:
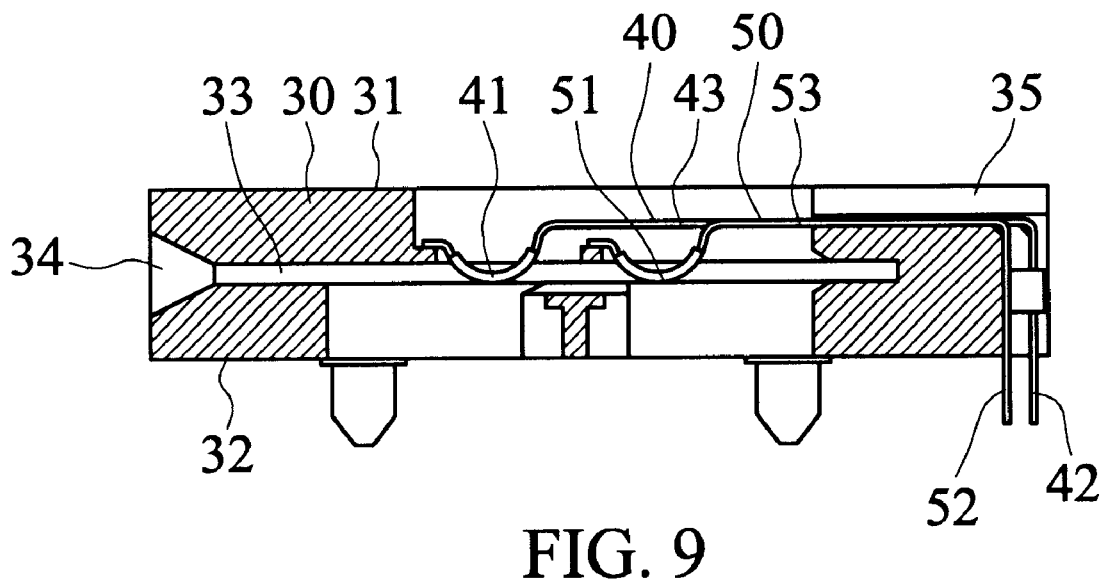
FIG. 9 is a cross-sectional view showing a card connector according a third embodiment of the invention.
Figure 10:
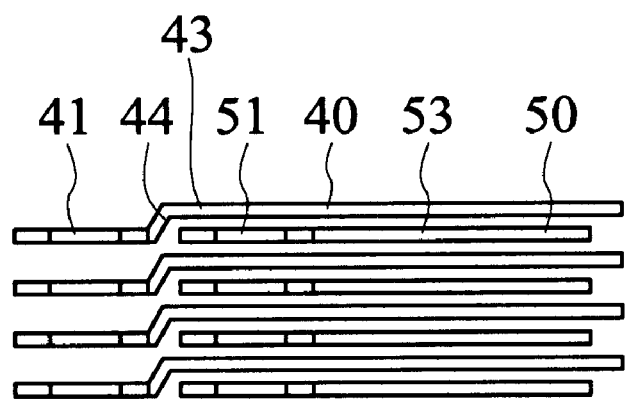
FIG. 10 is a schematic top view showing the arrangement of terminals according to the third embodiment of the invention.

Referring to FIGS. 9 and 10, a card connector according to the third embodiment of the invention includes a base 30 and one row of first upper terminals 40 and one row of second upper terminals 50 arranged on the base. The difference between the third and first embodiments resides in that the extensions 43 and 53 of the first and second terminals 40 and 50 are positioned at the same level, and the contacts 41 and 51 are well aligned and flush with each other. According to such a design, the terminal slots of the base 30 need not to be formed as wide and narrow slots having different depths. In addition, the extensions 43 of the first upper terminals 40 have to be formed with bends 44 so as to align the contacts 41 with the contacts 51.

In FIGS. 9 and 10, the contacts 41 of the first upper terminals 40 are closer to the insert port 34 than the contacts 51 of the second upper terminals 50. The extensions 43 of the first upper terminals 40 are flush with the extensions 53 of the second upper terminals 50. The pins 52 of the second upper terminals 50 are closer to the insert port 34 than the pins 42 of the first upper terminals 40.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A card connector, comprising:

a base having a top surface and a bottom surface and formed with a card slot for receiving an electric card, the card slot having an insert port from which the electric card may be inserted;

a row of first upper terminals arranged on the base, each of the first upper terminals having a contact positioned within the card slot for elastically contacting the inserted electric card, a pin extending out of the bottom surface of the base, and an extension connecting the contact to the pin; and a row of second upper terminals arranged on the base, each of the second upper terminals having a contact positioned within the card slot for elastically contacting the inserted electric card, a pin extending out of the bottom surface of the base, and an extension connecting the contact to the pin, wherein:

each of the contacts of the first and second upper terminals is convex toward the bottom surface of the base;

each of the contacts of the first and second upper terminals is elastically biased toward the top surface of the base when contacting the electric card; and each of the pins of the first and second upper terminals extends out of the bottom surface of the base from a side opposite to the insert port of the card slot;

the contacts of the first upper terminals are closer to the insert port than the contacts of the second upper terminals; and the pins of the second upper terminals are closer to the insert port than the pins of the first upper terminals.

2. The card connector according to claim 1, further comprising a row of first lower terminals, each of the first lower terminals having a contact positioned within the card slot for elastically contacting the inserted electric card, a pin extending out of the bottom surface of the base, and an extension connecting the contact to the pin, wherein:

each of the contacts of the first lower terminals is convex toward the top surface of the base; and each of the contacts of the first lower terminals is elastically biased toward the bottom surface of the base when contacting the electric card.

3. The card connector according to claim 2, wherein the base is formed with spaced terminal slots at a side opposite to the insert port and above the card slot, each of the terminals slots has a wider upper slot and a narrower lower slot below the wider upper slot, the second upper terminals are positioned within the lower slot, and the first upper terminals are positioned within the upper slot.

4. The card connector according to claim 1, wherein the extensions of the first upper terminals are flush with the extensions of the second upper terminals.

* * * * *